(12) United States Patent
Wang et al.

(10) Patent No.: US 8,619,438 B2
(45) Date of Patent: Dec. 31, 2013

(54) RESONANT CONVERTER

(75) Inventors: Zan Wang, Singapore (SG); Dong Li, Singapore (SG); Jianwei Liu, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 40 days.

(21) Appl. No.: 13/111,511

(22) Filed: May 19, 2011

(65) Prior Publication Data

US 2012/0294047 A1    Nov. 22, 2012

(51) Int. Cl.
*H02M 3/335* (2006.01)

(52) U.S. Cl.
USPC ........................................................ 363/21.02

(58) Field of Classification Search
USPC ................................ 363/16, 17, 21.02, 21.03
See application file for complete search history.

(56) References Cited

U.S. PATENT DOCUMENTS

| | | | |
|---|---|---|---|
| 4,263,642 A | 4/1981 | Simmons et al. | |
| 4,691,273 A | 9/1987 | Kuwata et al. | |
| 5,065,301 A * | 11/1991 | Shioya et al. | 363/17 |
| 6,356,461 B1 * | 3/2002 | Jacobs | 363/17 |
| 6,483,724 B1 * | 11/2002 | Blair et al. | 363/17 |
| 6,753,674 B2 * | 6/2004 | Grundl et al. | 323/282 |
| 7,554,820 B2 | 6/2009 | Stanley | |
| 8,174,851 B2 * | 5/2012 | Elferich | 363/21.03 |
| 2006/0152947 A1 * | 7/2006 | Baker et al. | 363/16 |
| 2009/0303753 A1 | 12/2009 | Fu et al. | |

FOREIGN PATENT DOCUMENTS

DE       102006041545 A1     4/2007

OTHER PUBLICATIONS

Mammano, B., "Resonant Mode Converter Topologies," 2001, Texas Instruments Incorporated, 14 pages.
Yang, B., et al., "Over Current Protection Methods for LLC Resonant Converter," 2003, IEEE, 5 pages.
Fairchild Semiconductor, "Half-bridge LLC Resonant Converter Design Using FSFR-series Fairchild Power Switch (FPS™)," Application Note AN-4151, Oct. 9, 2007, Fairchild Semiconductor Corporation, pp. 1-17.

* cited by examiner

*Primary Examiner* — Jue Zhang
(74) *Attorney, Agent, or Firm* — Slater & Matsil, L.L.P.

(57) ABSTRACT

A resonant converter includes first and second input terminals for applying an input voltage and first and second output terminals for providing an output voltage. A transformer includes a primary winding and a secondary winding, where both the primary winding and the secondary winding have a first and a second terminal. A series resonant circuit includes a capacitive element and the primary winding of the transformer. A switching circuit is connected between the input terminals and the series resonant circuit. A rectifier circuit is connected between the secondary winding and the output terminals. A clamping circuit is connected between one of the first and second terminals of the primary winding and the input terminals.

19 Claims, 4 Drawing Sheets

RESONANT CONVERTER

TECHNICAL FIELD

Embodiments of the present invention relate to a resonant power converter, in particular, a series resonant converter or an LLC converter.

BACKGROUND

Resonant converters are becoming more and more popular in the field of power conversion, because they can be operated at high frequencies and offer low switching losses.

A resonant converter includes at least one half-bridge circuit with two switches that generates a square wave voltage from a DC input voltage. The square wave voltage is supplied to a resonant circuit, and the voltage across one of the circuit elements of the resonant circuit is rectified in order to provide a DC output voltage. The square wave voltage causes an oscillating voltage in the resonant circuit. This oscillating voltage allows the switches of the half-bridge circuit to be switched with zero voltage, which helps to keep switching losses low, even at high switching frequencies.

The resonator of the resonant converter may include a transformer with a primary winding and a secondary winding. In this type of converter, usually a voltage across the secondary winding is rectified employing a rectifier network connected between the secondary winding and output terminals. At the output terminals the output voltage is available. A series resonant converter has a series LC circuit connected in series with the primary winding of the transformer, and an LLC converter additionally connected to the LC circuit includes a further inductance connected in parallel with the primary winding of the transformer.

The input power of a resonant converter and, therefore, the output voltage can be regulated by suitably adjusting the switching frequency of the half-bridge circuit. The resonant converter can be operated at frequencies above a resonant frequency of the resonant network and can be operated at frequencies below the resonant frequency, wherein the operation mode influences the current waveform in the rectifier network.

In a series resonant converter and in an LLC converter a voltage ringing with high voltage peaks may occur on the secondary side rectifier network, especially in those cases in which the rectifier network has a center-tap topology. This ringing may result from parasitic oscillator circuits that may include parasitic capacitances and parasitic inductances of the oscillator. In conventional converters the circuit elements in the rectifier network are selected such that their voltage blocking capability is high enough so as to withstand these high voltage peaks. However, this increases the costs and reduces the overall converter efficiency, because circuit elements with a higher voltage blocking capability usually have higher conduction losses.

There is, therefore, a need to provide a resonant converter, in particular, a series resonant converter or an LLC converter, in which voltage ringing on the secondary side of the transformer is largely prevented or at least partially suppressed.

SUMMARY OF THE INVENTION

One embodiment relates to a resonant converter, including first and second input terminals for applying an input voltage, first and second output terminals for providing an output voltage, and a transformer with a primary winding and a secondary winding, where each of the primary winding and the secondary winding have a first and a second terminal. The converter further includes a series resonant circuit with a capacitive element and the primary winding of the transformer, a switching network connected between the input terminals and the series resonant circuit, a rectifier circuit connected between the secondary winding and the output terminals, and a clamping circuit connected between the first terminal of the primary winding and the input terminals.

BRIEF DESCRIPTION OF THE DRAWINGS

Embodiments of the present invention will now be explained with reference to the drawings. It should be noted that these embodiments serve to illustrate the basic principles, so that only those features necessary for understanding the basic principles are illustrated. The drawings are not to scale. Further, like reference characters denote like features throughout the drawings.

DETAILED DESCRIPTION OF ILLUSTRATIVE EMBODIMENTS

Figure 1:
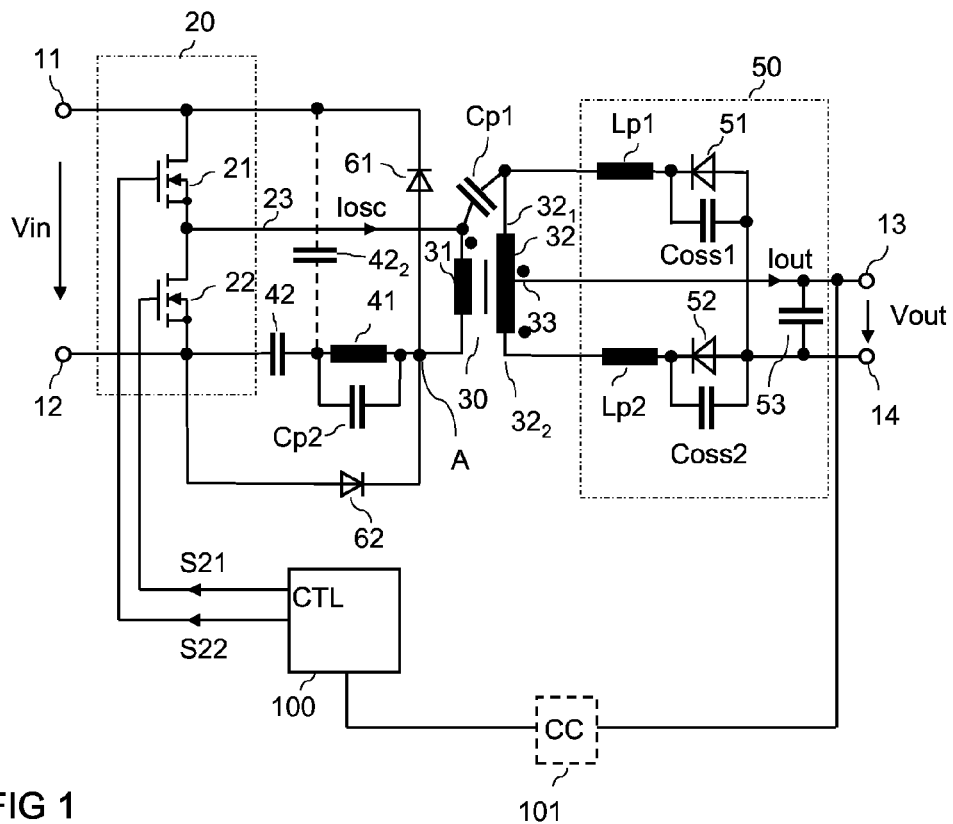
FIG. 1 schematically illustrates a first embodiment of a series resonant converter including a clamping circuit.

FIG. 1 schematically illustrates a circuit diagram of a series resonant converter according to a first embodiment. The converter includes first and a second input terminals 11, 12 for applying an input voltage Vin, and first and a second output terminals 13, 14 for providing an output voltage Vout. The input voltage Vin is, for example, a DC voltage or a rectified AC voltage, such as a rectified sinusoidal wave voltage. The output voltage Vout is a DC voltage. The converter is configured to generate a controlled or regulated output voltage Vout from the input voltage Vin, which means that the converter is configured to generate the output voltage Vout such that the output voltage Vout equals a given reference voltage.

The series resonant converter illustrated in FIG. 1 includes a conventional basic topology with: a switching circuit 20 coupled to the input terminals 11, 12; a transformer 30 with a primary winding 31 and a secondary winding 32; a series resonant circuit including the primary winding 31 of the transformer 30; and a rectifier circuit 50 coupled between the secondary winding 32 of the transformer 30 and the output terminals 13, 14. Additionally to this basic topology the series resonant converter includes a clamping circuit 61, 62. The operating principle of the clamping circuit 61, 62 will be explained in further detail herein below.

In the converter illustrated in FIG. 1, the switching circuit 20 includes a half-bridge circuit with a first and a second switching element 21, 22 each having a load path and a control terminal. The load paths of the two switching elements 21, 22 are series connected between the input terminals 11, 12. A circuit node common to the load paths of the two switching elements 21, 22 forms an output 23 or midpoint of the half-bridge circuit. The switching elements 21, 22 can be implemented as conventional electronic switches, such as MOSFETs, IGBTs, or BJTs. Just for illustration purposes the switching elements 21, 22 are implemented as MOSFETs, specifically as n-type enhancement MOSFETs, in the embodiment illustrated in FIG. 1. These MOSFETs each have drain-source paths between drain and source terminals and a gate terminal. The drain-source paths of the MOSFETs each form a load path and are series connected between the input terminals 11, 12. The gate terminals of the MOSFETs 21, 22 form a control terminal. The first switching element 21 acts as a high-side switch and the second switching element 22 acts as a low-side switch in the half-bridge circuit.

The series resonant circuit includes the primary winding 31 as a first inductive element, a second inductive element 41, and at least one capacitive element 42 connected in series between the output 23 of the half-bridge circuit 21, 22 and the second output terminal 14. A resonance frequency of the series resonant circuit is dependent on inductances of the primary winding 31 and the second inductive element 41, and of a capacitance of the capacitive element 42. The second inductive element 41 can be implemented as a discrete component, but could also be implemented as a parasitic inductance, such as a line inductance or leakage inductance of the transformer.

According to one embodiment that is illustrated in dashed lines in FIG. 1, the series resonant circuit does not only include one capacitive element 42 coupled to the second input terminal 12, but also includes a further capacitive element 42$_2$. This further capacitive element 42$_2$ is also connected in series with the second inductive element 41 and is coupled to the first input terminal 11. The two capacitive elements 42, 42$_2$ may have identical capacitances. Two capacitive elements 42, 42$_2$ are, in particular, implemented in those cases in which the switching arrangement 20 is implemented as a half-bridge circuit, as illustrated in FIG. 1.

The rectifier circuit 50 includes first and second rectifier elements 51, 52. The first rectifier element 51 is connected between a first terminal 32$_1$ of the secondary winding 32 and the second output terminal 14, and the second rectifier element 52 is connected between a second terminal 32$_2$ of the secondary winding 32 and the second output terminal 14. Further, a capacitive element 53, such as a capacitor, is connected between the output terminals 13, 14. The secondary winding 32 has a center tap coupled to the first output terminal 13. The topology of the rectifier network 50 is, therefore, referred to as center-tap rectifier topology.

The rectifier elements 51, 52 are connected such that an output current Tout of the converter can flow in the direction as shown in FIG. 1. It should be noted that it is also possible to connect the center tap of the secondary winding to the second output terminal 14 and to connect the first and second rectifier elements 51, 52 between the first and second terminals 32$_1$, 32$_2$ of the secondary winding, respectively, and between the first output terminal 13. In this case, however, the polarity of the rectifier elements has to be reversed.

The operating principle of the series resonant converter of FIG. 1 will be briefly explained in the following. The switching circuit 20 generates a square wave voltage at the output 23 of the half-bridge circuit by alternatingly switching on and off the two switching elements 21, 22. When the first switching element 21 is switched on, the second switching element 22 is switched off, and when the second switching element 22 is switched on, the first switching element 21 is switched off. Additionally, there is a dead time Td between on-times of the two switching elements 21, 22. An on-time of a switching element is the time during which the respective switching element is switched on. During the dead times Td both of the switching elements 21, 22 are switched off. Providing dead times between the on-times of the switching elements 21, 22 helps to safely prevent a shunt current between the input terminals 11, 12 and to allow a zero voltage switching of the switching elements 21, 22. "Zero voltage switching" means that the first and second switching elements can be switched when the voltage across their load path is zero. During the dead time Td the load path voltage can decrease to zero before the respective switching element 21, 22 is switched on.

Figure 2:
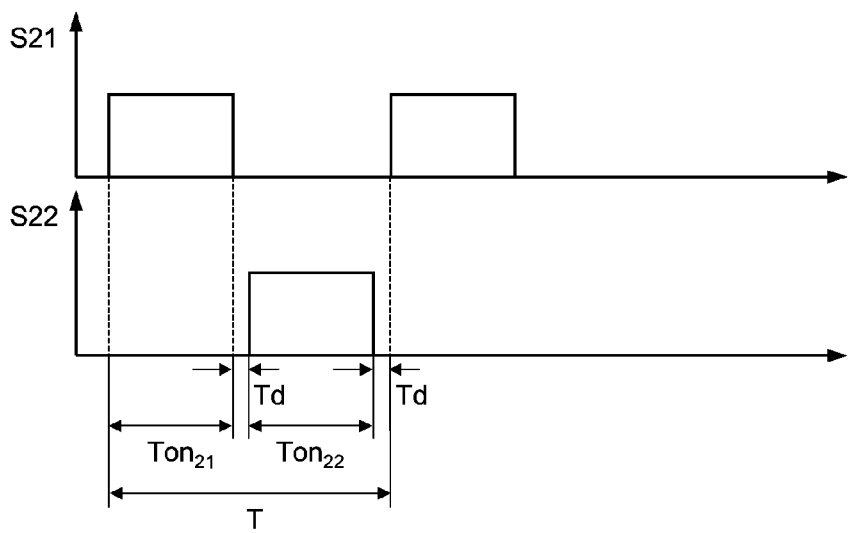
FIG. 2 illustrates timing diagrams of drive signals occurring in the converter of FIG. 1.

FIG. 2 schematically illustrates timing diagrams of a first drive signal S21 of the first switching element 21 and of a second drive signal S22 of the second switching element 22. These drive signals S21, S22 are generated by a control circuit 100. The drive signals S21, S22 have an on-level when the corresponding switching element 21, 22 is to be switched on, and have an off-level when the corresponding switching element 21, 22 is to be switched off. For explanation purposes it is assumed that an on-level of a drive signal S21, S22 is a high signal level, and that an off-level is a low signal level. In FIG. 2, Td denotes the dead time between on-pulses of the first and second drive signals S21, S22. On-pulses are those pulses during which the corresponding switching elements 21, 22 are switched on. In FIG. 2, T denotes the duration of one switching cycle or one drive period of the converter. In each switching cycle each of the switching elements 21, 22 is switched on once for an on-period Ton$_{21}$, Ton$_{22}$. A duty cycle D of the switching operation is defined by a ratio Ton$_{21}$/T between the duration Ton$_{21}$ of the on-period of the first switching element 21 and the duration T of one switching cycle. Usually, the duty cycle D is about 0.5 or 50%. In fact, the duty cycle D is slightly below 50%, due to the dead times Td.

When the first switching element 21 is switched on, the voltage at the output 23 of the half-bridge circuit approximately equals the input voltage Vin (when a voltage drop across the load path of the first switching element 21 is neglected). During the on-time of the first switching element 21, electrical energy is received via the input terminals 11, 12 and is magnetically stored in the primary winding 31 and the second inductive element 41 and is capacitively stored in the capacitive element 42. This energy stored in the circuit elements of the series resonant circuit causes a current through the series resonant circuit to continue after switching off the first switching element 21. During off-times of the first switching element 21 the second switching element 22 provides a free-wheeling current path for the current in the series resonant circuit. During the dead times Td, integrated body diodes of the MOSFETs 21, 22 provide a current path. In case circuit elements are used as first and second switching elements 21, 22 that do not include an integrated diode, diodes can be provided parallel to the load paths of the switching elements 21, 22.

The control circuit 100 generates the drive signals S21, S22 dependent on the output voltage Vout in order to regulate the output voltage Vout such that the output voltage assumes a given reference voltage. For this, the output voltage Vout or a signal dependent on the output voltage Vout is fed back to the control circuit 100. The control circuit 100 can be implemented on the primary side of the converter, which is on the side of the primary winding 31. In this case, a coupling circuit 101 (illustrated in dashed lines) can be arranged between the output of the converter and the control circuit 100. The coupling circuit 101 includes circuit elements that are suitable to transfer the output voltage Vout or a signal including information on the output voltage Vout from the secondary side of the converter to the control circuit 100 (on the primary side of the converter) across a potential barrier provided by the transformer 30. The coupling circuit 101 may circuit elements that are suitable to transfer electrical signal across a potential barrier. Such circuit elements are, for example, an opto-coupler, a transformer, in particular a coreless transformer, etc. Such coupling circuits are commonly known so that no further explanations are required in this regard.

Figure 5:
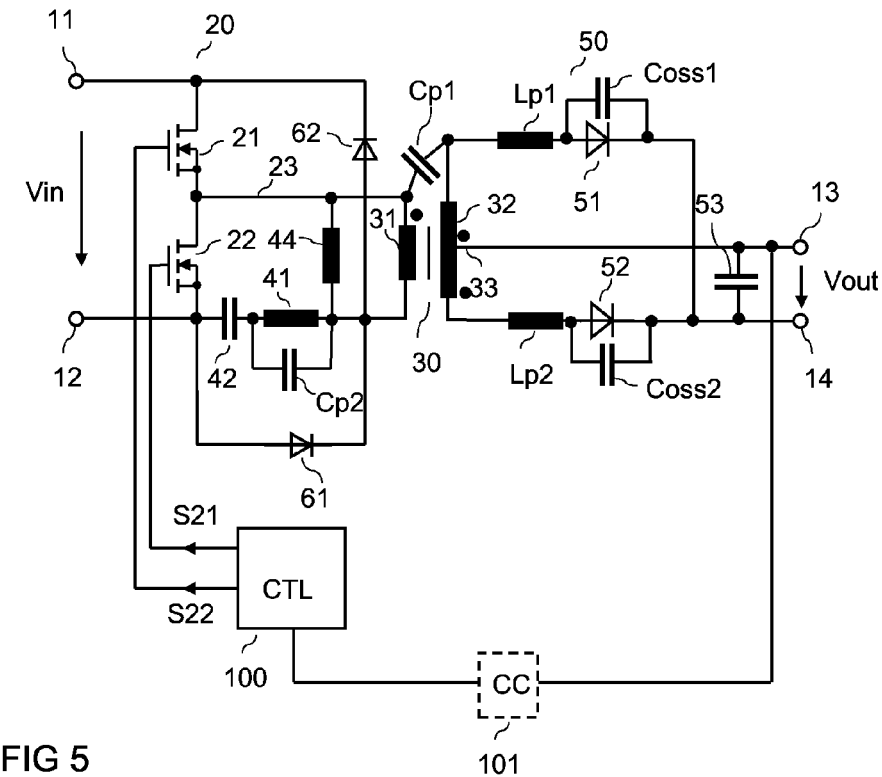
FIG. 5 illustrates a first embodiment of an LLC resonant converter.
Figure 6:
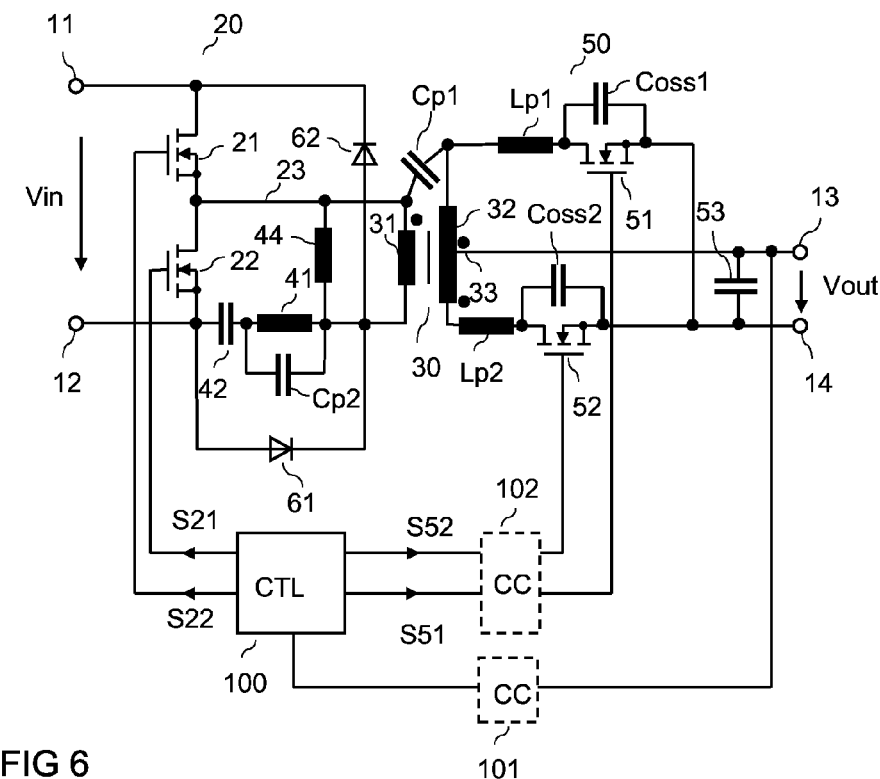
FIG. 6 illustrates a second embodiment of an LLC resonant converter.
Figure 7:
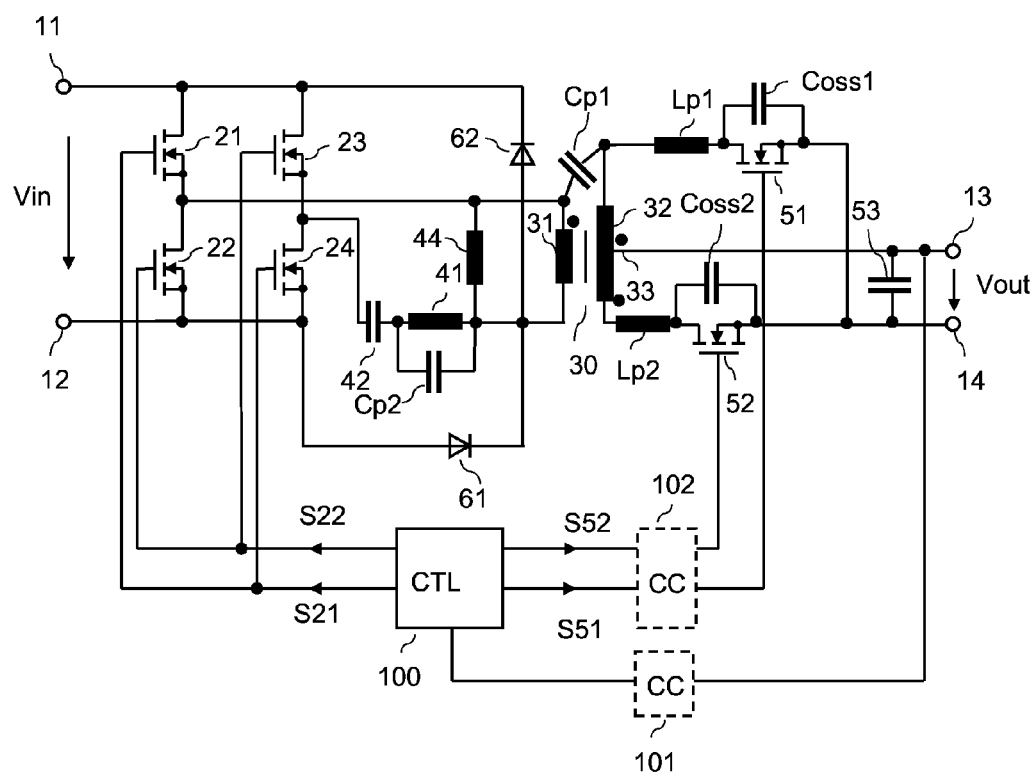
FIG. 7 illustrates a third embodiment of an LLC resonant converter.

The control circuit 100 can be implemented as a conventional control circuit of a series resonant converter. The control circuit 100 is configured to adjust or vary the switching frequency of the half-bridge circuit dependent on the output voltage Vout in order to regulate the output voltage Vout. The switching frequency of the half-bridge circuit is the reciprocal of the duration T of one switching cycle, i.e., f=1/T. The voltage regulation principle in a resonant converter, such as the series resonant converters in FIGS. 1, 3 and 4 or the LLC converters in FIGS. 5 to 7, are commonly known, so that no further explanations are required in this regard.

The converter can be operated at switching frequencies f below a resonance frequency $f_{RES}$ of the series resonant circuit and can be operated at switching frequencies f above the resonance frequency $r_{RES}$ of the series resonant circuit. In both operation modes, i.e., at switching frequencies below the resonance circuit and at switching frequencies above the resonance circuit, the input power of the converter and, therefore, the output voltage Vout can be regulated by varying the switching frequency f of the converter. The input power of the converter is the electrical power the converter receives at its input terminals 11, 12. At a fixed input voltage Vin the input power is dependent on the switching frequency.

Figure 3:
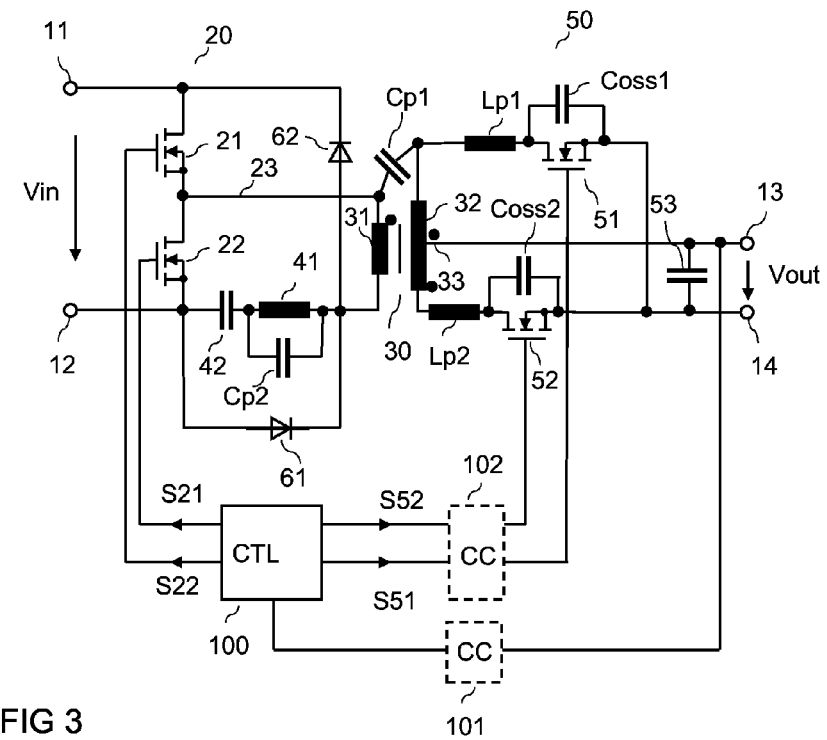
FIG. 3 illustrates a second embodiment of a series resonant converter.

Referring to FIG. 1, the converter includes parasitic capacitances Cp1, Cp2. A first parasitic capacitance Cp1 is a parasitic capacitance of the second inductive element 41. In this connection it should be mentioned that the second inductive element 41 can be a discrete inductive element, or can be a parasitic inductive element, such as a parasitic inductive element of the transformer 30. A second parasitic capacitance Cp2 is a parasitic capacitance of the transformer 30 and is present between the primary winding 31 and the secondary winding 32 of the transformer 30. Further, the converter includes parasitic inductances Lp1, Lp2 in the rectifier network 50. These parasitic inductances Lp1, Lp2 are, in particular, leakage inductances of the transformer 30 and/or line inductances. Additionally, the rectifier elements 51, 52 may include output capacitances Coss1, Coss2 acting as parasitic capacitances. These parasitic capacitances Coss1, Coss2 are present between the load terminals of the rectifier elements 51, 52. These output capacitances Coss1, Coss2 have, in particular, a significant capacitance in those cases in which the rectifier elements are implemented as synchronous rectifier (SR) MOSFETs, as illustrated in FIG. 3.

The parasitic capacitances Cp1, Cp2 together with the parasitic inductances Lp1, Lp2 form parasitic oscillation circuits. These parasitic oscillation circuits may cause voltage overshoots at the first and second terminals $32_1$, $32_2$ of the secondary winding 32. These voltage overshoots may damage the rectifier elements 51, 52 connected between the first and second terminals $32_1$, $32_2$ of the secondary winding 32 and one of the output terminals, which is the second output terminal 14 in the embodiment illustrated in FIG. 1. In order to prevent the rectifier elements 51, 52 from being damaged these rectifier elements 51, 52 could be selected such that they have a sufficiently high voltage blocking capability. However, the costs of the converter and also the ohmic losses in the rectifier network 50 increase with increasing voltage blocking capabilities of the rectifier elements 51, 52.

The generation of these voltage overshoots at the first and second terminals $32_1$, $32_2$ of the secondary winding 32 will briefly be explained in the following: The square wave voltage provided at the output 23 of the half-bridge circuit causes an oscillator current Iosc to flow in the series resonator circuit. The oscillator current Iosc, however, is not in phase with the square wave voltage provided at output 23, so that the oscillator current Iosc changes its direction during the on-phase of one of the first and second switching elements 21, 22. When the second switching element 22 is switched on, the oscillator current Iosc first flows in a first direction (which is the direction illustrated in FIG. 1) and then changes its direction so as to flow in an opposite second direction. When the first switching element 21 is switched on, the oscillator current first continues to flow in the second direction and then changes its direction so as to flow in the opposite first direction. Oscillations caused by the parasitic circuit elements Cp1, Cp2, Lp1, Lp2, and Coss1, Coss2 may occur each time the oscillator current Iosc changes its current flow direction and each time the square wave voltage provided at the output terminal 23 changes its amplitude, which is each time one of the switching elements 21, 22 is switched off and the other one is switched on. Two different types of oscillations (ringing) may occur, a first type which occurs when the oscillator current Iosc changes its direction, and a second type which occurs when the square wave voltage at the output 23 changes its amplitude (from Vin to zero, or from zero to Vin).

Both types of oscillations may cause voltage overshoots at the terminals of the secondary winding 32 and, therefore, at the first and second rectifier elements 51, 52. Voltage overshoots (of the first type) at the first rectifier element 51 may occur during the on-phase of the second switching element 22, when the oscillator current Iosc changes its direction from the first direction to the second direction. These voltage overshoots (oscillations) are, in particular, caused by Lp1 and the output capacitance Coss1 of the first rectifier element 51. Voltage overshoots (of the second type) at the first rectifier element 51 may further occur at the beginning of the on-phase of the first switching element. These voltage overshoots (oscillations) are, in particular, caused by Lp2 and the parasitic capacitances Cp1, Cp2.

Voltage overshoots (of the first type) at the second rectifier element 52 may occur during the on-phase of the first switching element 21, when the oscillator current Iosc changes its direction from the second direction to the first direction. These voltage overshoots (oscillations) are, in particular, caused by Lp2 and the output capacitance Coss2 of the second rectifier element 52. Voltage overshoots (of the second type) at the second rectifier element 52 may further occur at the beginning of the on-phase of the second switching element. These voltage overshoots (oscillations) are, in particular, caused by Lp1 and the parasitic capacitances Cp1, Cp2.

In order to prevent or at least partly suppress those voltage overshoots the converter includes a clamping circuit with a first clamping element 61 connected between a circuit node A and the first input terminal 11, and a second clamping element 62 connected between circuit node A and the second input terminal 12. The first clamping element 61 is connected such that it clamps the electrical potential at the circuit node A to the electrical potential at the first input terminal 11. The second clamping element 62 is connected such that it clamps the electrical potential at circuit node A to the electrical potential at the second input terminal 12. According to one embodiment, the second input terminal 12 is connected to a reference potential, such as GND. In this case, the second circuit element 62 clamps the electrical potential at the circuit node A to the reference potential, while the first clamping element 61 clamps the electrical potential at the circuit node A to the input voltage Vin. The clamping elements 61, 62 are, for example, PN diodes, PIN diodes or Schottky diodes. In the embodiment illustrated in FIG. 1, the two clamping elements are implemented as PN diodes, where the anode terminal and the cathode terminal of the first clamping diode 61 are connected to the circuit node A and the first input terminal 11, respectively, and the anode and cathode terminals of the second clamping diode 62 are connected to the second input terminal 12 and the circuit node A, respectively.

Since the first and second terminals $32_1$, $32_2$ of the secondary winding 32 are inductively coupled to the circuit node A, clamping the voltage at circuit node A to one of the input voltage Vin and zero also causes the voltages at the first and second terminals $32_1$, $32_2$ of the secondary winding to be clamped. The first clamping element 61 clamps voltage spikes occurring at the second rectifier element 52, and the second clamping element 61 clamps voltage spikes occurring at the first rectifier element 51.

Referring to FIG. 1, circuit node A is one of the terminals of the primary winding 31. In this embodiment, circuit node A is a second terminal of the primary winding 31, where a first terminal of the primary winding 31 is connected to the output 23 of the half-bridge circuit. The second inductive element 41 and the capacitive element 42 are connected between the second terminal of the primary winding 31 and the second input terminal 12, so that circuit node A is a circuit node arranged between the primary winding 31 and the other circuit elements of the series resonant circuit.

It should be noted, that voltage overshoots that are clamped by the clamping circuit 61, 62 occur, in particular, in an operation mode in which the switching frequency f is above the resonant frequency $f_{RES}$ of the series resonant circuit. In this operation mode the rectifier network 50 is operated in a continuous current mode (CCM), which means that there is a continuous current Ir from the center tap 33 of the secondary winding 32 to the output capacitor 53. Usually, a series resonant converter is operated at switching frequencies above the resonant frequency, so that the clamping circuit explained with reference to FIG. 1 helps to reduce voltage overshoots in the "normal" operation mode of a series resonant converter.

The use of the clamping circuit 61, 62 explained with reference to FIG. 1 is not restricted to be used in a series resonant converter with exactly the topology as illustrated in FIG. 1. Instead, the clamping circuit can be used in connection with a plurality of other converter topologies as well. Some examples of these topologies will be explained with reference to FIGS. 3 to 7 in the following.

FIG. 3 illustrates a further embodiment of a series resonant converter. The converter of FIG. 3 is based on the converter of FIG. 1, where the rectifier network 50 includes synchronous rectifiers 51, 52 as rectifier elements. These synchronous rectifiers are implemented as n-type enhancement MOSFET that are controlled by the control circuit 100 by drive signals S51, S52. According to one embodiment, a further coupling circuit 102 can be used to transmit the drive signals S51, S52 for the synchronous rectifier MOSFETs 51, 52 from the control circuit 100 via the potential barrier to the synchronous rectifier MOSFETs 51, 52. The control circuit 100 is configured to switch on the synchronous rectifier MOSFETs 51, 52 during those time periods in which diodes that could be used instead of the synchronous rectifier MOSFETs would be conducting. The use and control of synchronous rectifier (SR) MOSFETs in a series resonant converter is commonly known, so that no further explanations are required in this regard.

Figure 4:
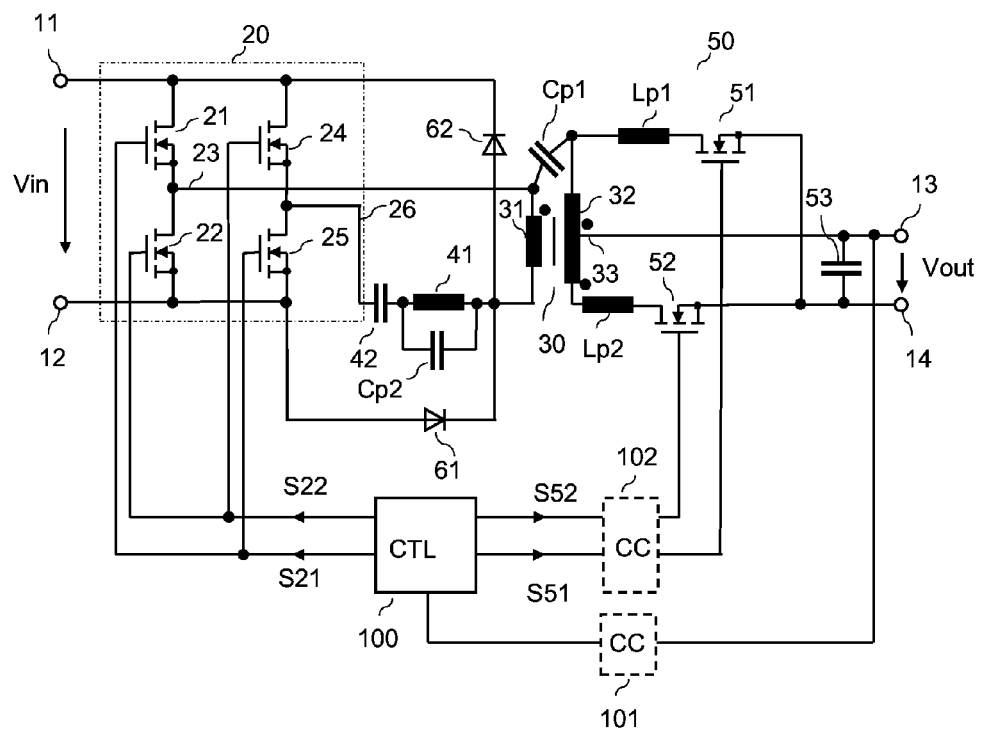
FIG. 4 illustrates a third embodiment of a series resonant converter.

FIG. 4 illustrates a further embodiment of a series resonant converter. This converter is based on the converter of FIG. 3 and is different from the converter in FIG. 3 in that the switching circuit 20 additionally to the half-bridge with the first and second switching elements 21, 22 includes a second half-bridge circuit with a third and a fourth switching element 24, 25. These third and fourth switching elements 24, 25 have their load paths series connected between the input terminals 11, 12 and form an output 26. The two switches 24, 25 of the second half-bridge circuit are implemented as n-type enhancement MOSFET in the embodiment illustrated in FIG. 4. However, everything which has been explained concerning the implementation of the first half-bridge circuit 21, 22 applies to the implementation of the second half-bridge circuit as well.

In the converter of FIG. 4, the series resonant is connected between the output 23 of the first half-bridge circuit and the output 26 of the second half-bridge circuit. The third switching element 24 that is connected between the first input terminal 11 and the series resonant circuit is driven by the second drive signal S22, which also drives the second switching element 22. The fourth switching element 25 that is connected between the series resonant circuit and the second input terminal 12 is driven by the first drive signal S21, which also drives the first switching element 21. Thus, when the first terminal of the series resonant circuit is connected to the first input terminal 11 via the first switching element 21, a second terminal of the series resonant circuit is connected to the second input terminal 12 via the fourth switching element 25; and when the first terminal of the series resonant circuit is connected to the second input terminal 12 via the second switching element, the second terminal of the series resonant circuit is connected to the first input terminal 11 via the third switching element 24.

Referring to FIGS. 5 to 7 use of the clamping circuit 61, 62 explained herein before is not restricted to a series resonant converter, but the clamping circuit 61, 62 can also be used in an LLC converter. An LLC converter is different from a series resonant converter in that the series resonant circuit in an LLC converter includes a third inductive element connected in parallel with the primary winding of the transformer. FIG. 5 illustrates an LLC converter with a topology that is based on the topology of the series resonant converter of FIG. 1, FIG. 6 illustrates an LLC converter with a topology that is based on the topology of the series resonant converter of FIG. 3, and FIG. 7 illustrates an LLC converter with a topology that is based on the series resonant converter of FIG. 4. The LLC converters of FIGS. 5 to 7 are different from the series resonant converters according to FIGS. 1, 3 and 4, respectively, in that a third inductive element 44 is connected in parallel with the primary winding 31 of the transformer 30. Everything which has been explained concerning the other circuit elements of the series resonant converters of FIGS. 1, 3 and 4 applies to the circuit elements of the LLC converters of FIGS. 5 to 7, accordingly.

Other than a series resonant converter, an LLC converter is usually operated at switching frequencies that are below the resonance frequency $f_{RES}$ of the series resonator circuit. In this connection it should be noted that the resonance frequency of the series resonant circuit in an LLC converter is also dependent on the third inductive element 44. Although the "normal" operation mode of an LLC converter is at frequencies below the resonance frequency, an LLC converter is usually operated at switching frequencies above the resonance frequency at the time of start-up, wherein the switching frequency is reduced to "normal" switching frequencies below the resonant frequency after start-up.

Using higher switching frequencies at the time of start-up helps to keep an inrush current into the third inductive element 44 (the shunt inductive element) low. Thus, providing a clamping circuit helps to reduce voltage overshoots in the rectifier network 50 occurring at switching frequencies above the resonance frequency, also makes sense in an LLC converter.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:
1. A resonant converter, comprising:
first and second input terminals configured to receive an input voltage;
first and second output terminals configured to provide an output voltage;
a transformer comprising a primary winding and a secondary winding, wherein the primary winding has a first terminal and a second terminal and wherein the secondary winding has a first terminal and a second terminal;
a series resonant circuit comprising a capacitive element and the primary winding of the transformer, wherein the capacitive element is coupled between the second terminal of the primary winding and the second input terminal;
a switching circuit connected between the first and second input terminals and the series resonant circuit, wherein the switching circuit comprises a first switch and a second switch;
a control circuit configured to control the switching circuit, wherein
for a first period of time, the first switch is open and the second switch is closed,
for a second period of time, the switch is closed and the second switch is open,
for a third period of time, the first switch and the second switch are open, wherein the third period of time is between the first period of time and the second period of time,
for a forth period of time, the first switch is open and the second switch is closed, and
for a fifth period of time, the first switch and the second switch are open, wherein the fifth period of time is between the second period of time and the forth period of time;
a rectifier circuit connected between the secondary winding and the first and second output terminals; and
a clamping circuit connected between the first input terminal and the second input terminal comprising
a first clamping element coupled between the second terminal of the primary winding and the first input terminal, and
a second clamping element coupled between the second terminal of the primary winding and the second input terminal.

2. The resonant converter of claim 1, wherein the first terminal of the primary winding is arranged between the primary winding and the capacitive element.

3. The resonant converter of claim 1, further comprising:
an inductive element connected in series with the primary winding and the capacitive element.

4. The resonant converter of claim 3, further comprising:
a further inductive element connected in parallel with the primary winding.

5. The resonant converter of claim 1, wherein the first terminal of the primary winding is connected to the switching circuit.

6. The resonant converter of claim 1, wherein the first and second clamping elements are PN or PIN diodes.

7. The resonant converter of claim 1, wherein the first and second clamping elements are Schottky diodes.

8. The resonant converter of claim 1, wherein the rectifier circuit comprises:
a center tap of the secondary winding connected to the first output terminal;
a first rectifier element connected between the first terminal of the secondary winding and the second output terminal; and
a second rectifier element connected between the second terminal of the secondary winding and a second output terminal.

9. The resonant converter of claim 8, wherein the first and second rectifier elements are diodes.

10. The resonant converter of claim 8, wherein the first and second rectifier elements are synchronous rectifiers.

11. The resonant converter of claim 1, wherein the switching circuit comprises:
a first half-bridge circuit having two switches connected in series between the first and second input terminals, wherein the first half-bridge circuit has an output,
wherein the series resonant circuit is connected between the output of the first half-bridge circuit and the second input terminal.

12. The resonant converter of claim 11, wherein the switching circuit further comprises:
a second half-bridge circuit having two switches connected in series between the first and second input terminals, the second half-bridge circuit having an output,
wherein the series resonant circuit is connected between the outputs of the first half-bridge circuit and of the second half bridge circuit.

13. A circuit comprising:
a first input terminal;
a first terminal of a first switch connected to the first input terminal;
a first terminal of a second switch directly connected to a second terminal of the first switch;
a second input terminal connected to a second terminal of the second switch;
a transformer comprising
a primary winding having a first terminal directly connected to the second terminal of the first switch, and
a secondary winding;
a first diode having a first terminal connected to the first input terminal and a second terminal directly connected to a second terminal of the primary winding;
a second diode having a first terminal connected to the second input terminal and having a second terminal connected to the second terminal of the primary winding;
a first terminal of a first inductor connected to the second terminal of the primary winding;

a first capacitor having a first terminal connected to a second terminal of the first inductor and having second terminal coupled to the second input terminal;

a first output terminal connected to a center tap of the secondary winding;

a third diode connected between a first terminal of the secondary winding and the first output terminal;

a second output terminal connected to a second terminal of the third diode;

a fourth diode having a first terminal connected to a second terminal of the secondary winding and a second terminal connected to the second output terminal; and a first terminal of a second capacitor connected between the first output terminal and the second output terminal.

14. The circuit of claim 13, further comprising a third capacitor connected between the second terminal of the first inductor and the first input terminal.

15. The circuit of claim 13, wherein the third diode comprises a synchronous rectifier MOSFET.

16. The circuit of claim 13, further comprising:

a third switch connected between the first input terminal and the second terminal of the first capacitor; and a forth switch connected between the second input terminal and the second terminal of the first capacitor.

17. The circuit of claim 13, further comprises a second inductor connected between the first terminal of the primary winding and the second terminal of the primary winding.

18. The circuit of claim 13, wherein the first diode comprises a first Schottky diode, and wherein the second diode comprises a second Schottky diode.

19. The circuit of claim 13, further comprising a control circuit configured to control the first switch and the second switch, wherein for a first period of time, the first switch is open and the second switch is closed;

for a second period of time, the first switch is closed and the second switch is open;

for a third period of time, the first switch and second switch are open, wherein the third period time is between the first period of time and the second period of time;

for a forth period of time, the first switch is open and the second switch is closed; and for a fifth period of time, the first switch and the second switch are open, wherein the fifth period of time is between the second period of time and the forth period time.

* * * * *